(12) United States Patent
Mozer et al.

(10) Patent No.: US 7,418,392 B1
(45) Date of Patent: Aug. 26, 2008

(54) SYSTEM AND METHOD FOR CONTROLLING THE OPERATION OF A DEVICE BY VOICE COMMANDS

(75) Inventors: Todd F. Mozer, Los Altos Hills, CA (US); Forrest S. Mozer, Berkeley, CA (US); Erich B. Adams, San Jose, CA (US)

(73) Assignee: Sensory, Inc., Sunnyvale, CA (US)

( * ) Notice: Subject to any disclaimer, the term of this patent is extended or adjusted under 35 U.S.C. 154(b) by 734 days.

(21) Appl. No.: 10/938,346

(22) Filed: Sep. 10, 2004

Related U.S. Application Data

(60) Provisional application No. 60/506,357, filed on Sep. 25, 2003.

(51) Int. Cl.
*G10L 15/00* (2006.01)
(52) U.S. Cl. ............... 704/275; 704/270; 315/307; 315/308
(58) Field of Classification Search .......... 704/275, 704/270; 315/307, 308
See application file for complete search history.

(56) References Cited

U.S. PATENT DOCUMENTS

| | | | |
|---|---|---|---|
| 4,052,568 | A | 10/1977 | Jankowski |
| 5,562,453 | A | 10/1996 | Wen |
| 5,983,186 | A | 11/1999 | Miyazawa et al. |
| 6,324,514 | B2 | 11/2001 | Matulich et al. |
| 6,532,447 | B1 | 3/2003 | Christensson |

OTHER PUBLICATIONS

VOS Systems; "The IntelaVoice Voice Operated Lamp Switch"; http://web.archive.org/web/19990202033026/www.vossystems.com/; Dec. 5, 1998, United States.
VOS Systems; "The Wall Switch Dimmer with Touch Control"; http://web.archive.org/web/20020802232003/www.vossystems.com/wallswitch.htm; Jan. 22, 2000; United States.
VOS Systems; "The IntelaVoice Dimmer"; http://web.archive.org/web/20020607031151/www.vossystems.com/intelavoicedim.htm; Jan. 22, 2000; United States.
VOS Systems; "The IntelaVoice Voice Operated Christmas Tree Light Control"; http://web.archive.org/web/20020802191916/www.vossystems.com/index2.htm; Jan. 23, 2002; United States.
VOS Systems; Star Trek Voice Operated Dimmer; http://web.archive.org/web/20020802191916/www.vossystems.com/index2.htm; Jan. 23, 2002; United States.

*Primary Examiner*—Daniel D Abebe
(74) *Attorney, Agent, or Firm*—Chad R. Walsh; Fountainhead Law Group PC

(57) ABSTRACT

The present invention includes a speech recognition system comprising a light element, a power control switch, the power control switch varying the power delivered to the light element, a controller, a microphone, a speech recognizer coupled to the microphone for recognizing speech input signals and transmitting recognition results to the controller, and a speech synthesizer coupled to the controller for generating synthesized speech, wherein the controller varies the power to the light element in accordance with the recognition results received from the speech recognizer. Embodiments of the invention may alternatively include a low power wake up circuit. In another embodiment, the present invention is a method of controlling a device by voice commands.

21 Claims, 17 Drawing Sheets

SYSTEM AND METHOD FOR CONTROLLING THE OPERATION OF A DEVICE BY VOICE COMMANDS

RELATED APPLICATIONS

This invention relates to and claims priority from U.S. Provisional Patent Application No. 60/506,357 filed Sep. 25, 2003 naming Todd F. Mozer and Forrest S. Mozer as inventors, the contents of which is hereby incorporated herein by reference in its entirety.

BACKGROUND

The present invention relates to speech recognition and techniques for configuring and controlling devices incorporating speech recognition. In particular, the embodiments of the present invention relate to methods and apparatuses for controlling the operation of a device by voice commands.

Speech recognition systems are electronic systems implemented in hardware, software or a combination of hardware and software that allow a machine to recognize speech inputs. Speech recognizers can be used to control the behavior of an electronic system in accordance with the particular speech inputs received. For example, a speech recognition system may recognize a certain number of utterances (i.e., words or phrases). The set of utterances that a recognizer can understand is often referred to as the "recognition set." When a user speaks to a recognizer, the recognizer may produce different results (typically electronic signals or software states) corresponding to whether or not the input speech was an utterance in the recognition set, and additionally, but not necessarily, which of the utterances in the recognition set was received.

Typically, when a speech recognition system is powered on, the speech recognizer is always on and always listening for utterances in the recognition set. However, a speech recognizer that is always on and always listening for commands has two problems:

1. In battery operated products, the current drained by analyzing each sound can quickly wear down batteries.

2. In all products there is an issue of the recognizer incorrectly interpreting unintended sounds as commands (false accepts). This issue is exacerbated in products that are always on and always listening.

To address the first issue, battery operated speech recognition products typically require a button press or other switch to turn on the recognizer. These devices typically power down after some time if no command is recognized, thereby saving battery life. This approach, however, is self-defeating, because it requires the use of ones eyes, hands, and feet to locate the speech recognition device and turn it on. Examples of the use of such speech recognition in consumer electronic products include U.S. Pat. Nos. 6,188,986 and 6,324,514 for electrical switches, U.S. Pat. Nos. 6,101,338 and 5,980,124 for cameras, U.S. Pat. No. 4,771,390 for cars, and U.S. Pat. Nos. 6,526,381 and 5,199,080 for remote controls.

Improvements in speech recognition technology have decreased the false accept rate in continuously listening products. To further decrease this false accept rate, developers utilize "dual triggered" or "gated" approaches, in which the recognizer first listens for a trigger word, the occurrence of which activates a second recognition set whose output controls the device of interest. By this two step process, false accepts are less likely because wrong utterances must pass through two hurdles instead of one to activate the device. However, this introduces the problem of increasing the false reject rate, because the "right" words also must pass the double hurdle. Furthermore, this approach makes usage more cumbersome because a series of words must be recalled to activate the device.

To alleviate these problems, speech recognition has been used in combination with auxiliary sensing devices to improve recognition accuracy while decreasing false trigger rates. For example, U.S. Pat. Nos. 6,532,447 and 5,255,341 describe an auxiliary sensing device that is a proximity detector that turns on a speech recognizer in a cell phone and an elevator, respectively, when a potential user is nearby.

A proximity detector can also assist in saving battery life by keeping the device in a low power mode, but will not necessarily help the false triggers and recognition accuracy when people are in its vicinity. One such example is a speech recognizer that provides voice control of lights in a room even when there are people in the room; the recognizer would automatically go on, and conversations could created false triggers. Other types of sensors could be more effective in preventing false triggers. For example, a voice activated lamp or nightlight could be enabled only when needed during darkness to prevent false triggers when it is not needed (during daylight). Such a situation is more complex because one auxiliary sensing device for controlling the speech recognizer, such as the light sensor, is not sufficient to control its full operation. This occurs when the light sensor that activated the speech recognizer during the darkness gets deactivated by the light of the lamp. Once the room is illuminated by the lamp, the light detector would deactivate the recognizer, so the lights would have to be turned off manually and the benefit of turning the light off with a voice command would be lost.

The current state of the art for controlling the operation of a speech recognizer with an auxiliary sensing device (e.g. proximity sensor) is described by the block diagram of FIG. 1, in which power is provided to speech recognizer 3 from power supply 5 through switch 7 whose operation is controlled by auxiliary sensing device 9. When switch 7 is closed by auxiliary sensing device 9, speech recognizer 3 is powered to receive and analyze audio signals coming from microphone 1. The output of speech recognizer 3 controls the operation of device under control 11 when appropriate speech commands are spoken into the microphone. For example, auxiliary sensing device 9 may be the proximity sensor of U.S. Pat. No. 5,255,341, which causes speech recognizer 3 to be powered on when a potential user is in the proximity of an elevator, which is device 11 of FIG. 1. Thus, when a person is near the elevator and only when a person is near the elevator, the recognizer is activated to receive audio signals from microphone 1, which controls the operation of the elevator. The function of auxiliary sensing device 9 in this example is to minimize false commands to the elevator at times when no one is near but when false triggers from background noise might otherwise activate its operation.

The device described by FIG. 1 is not adequate to control the operation of a speech recognizer in all circumstances. For example, consider the case of a device under control 11 being a lamp that is controlled by commands to speech recognizer 3. Without a mechanism for controlling the power fed to the recognizer, it would consume unnecessary power and would false trigger the lamp off and on in response to extraneous noises or conversations when people are near. Thus, auxiliary sensing device 9 might be a light sensor that causes switch 7 to close only when the room is dark, because there is no need to command the lamp when the room is light. In this case, when the room is dark, speech recognizer 3 is powered from power supply 5 through switch 7 to control the lamp operation via verbal commands received by it from microphone 1. Thus, a person can turn on a lamp in the middle of the night without having to find it and push a button.

A problem arises when this same person wishes to turn off the lamp to go back to sleep. In this case auxiliary sensing device 9 may be activated to close switch 7 by the light coming from the lamp. So the only method for the person to turn off the lamp is to reach for it and push a button. This requirement greatly diminishes the utility of a lamp that is controlled by a speech recognizer.

Thus, there is a need for more sophisticated methods and apparatuses for controlling the operation of a device by voice commands.

SUMMARY

Features and advantages of the present invention include methods and apparatuses for controlling the operation of a device by voice commands. For example, in one embodiment the present invention includes a speech recognition system comprising a light element, a power control switch, the power control switch varying the power delivered to the light element, a controller, a microphone, a speech recognizer coupled to the microphone for recognizing speech input signals and transmitting recognition results to the controller, and a speech synthesizer coupled to the controller for generating synthesized speech, wherein the controller varies the power to the light element in accordance with the recognition results received from the speech recognizer.

In another embodiment, the present invention includes a speech recognition system comprising a microphone, a first low power audio channel coupled to the microphone, a second audio channel coupled to the microphone, and a processor having signal lines coupled to the first and second audio channels, wherein the processor turns on the first low power audio channel and turns off the second audio channel during a low power mode of operation, and the processor turns on the second audio channel when the first low power audio channel receives an input signal above a first threshold.

In another embodiment, the present invention includes a method of controlling a device by voice commands comprising storing a plurality of speech synthesis dialogs, generating a first dialog of the plurality of speech synthesis dialogs using a speech synthesizer, receiving a trigger word from a user, generating a second dialog of the plurality of speech synthesis dialogs using a speech synthesizer if the trigger word is in a first recognition set, receiving a command word from a user, and executing one of a plurality of predefined algorithms if the command word is in a second recognition set, the plurality of predefined algorithms including varying the power to a light element, generating a simulated dialog with a user or activating a plurality of light emitting diodes.

It is an objective of the present invention to utilize multiple auxiliary sensing devices to control the off/on condition of a speech recognizer whose commands control the operation of a device under control.

It is a second objective of the present invention to minimize the false trigger rate of the speech recognizer such that it listens for commands only at times needed for operation of the device under control.

It is a third objective of the present invention to minimize the current consumption of a speech recognizer by operating it only when needed to control the operation of a device under control.

It is a further objective of the present invention to provide a means for waking the speech recognizer from a low power state without having to press buttons.

It is another objective of the present invention to provide a lighting device that listens for commands when auxiliary sensors detect darkness or a current flowing through the lighting device.

In one embodiment of the present invention, a device, such as a lamp, is under the control of a speech recognizer which is, in turn controlled by two or more auxiliary sensing devices, at least one of which responds to changes in the environment.

In this embodiment of the present invention, the changes in the environment may include light intensity in a room, acoustic signals, or predetermined advancements in time.

In another embodiment of the present invention, the auxiliary sensing devices that control the operation of the speech recognizer may be in series such that both must be activated to control the operation of the speech recognizer.

In another embodiment of the present invention, the auxiliary sensing devices that control the operation of the speech recognizer may be in parallel such that one or the other can control the operation of the speech recognizer.

In another embodiment of the present invention, the auxiliary sensing devices may control the operation of the speech recognizer with logic signals.

In another embodiment of the present invention, the auxiliary sensing devices may control the operation of the speech recognizer by controlling the operation of the microphone that feeds it.

The following detailed description and accompanying drawings provide a better understanding of the nature and advantages of the present invention.

DETAILED DESCRIPTION

Described herein are techniques for controlling the operation of devices by voice commands. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include obvious modifications and equivalents of the features and concepts described herein.

Figure 1:
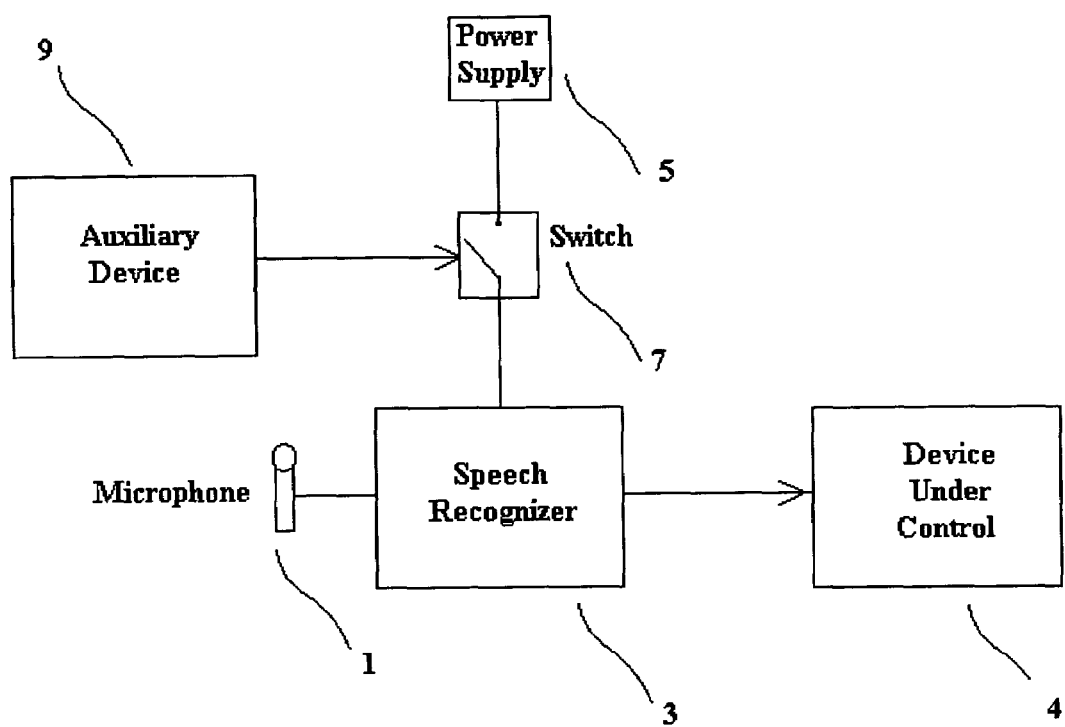
FIG. 1 is a block diagram of a device under the control of a speech recognizer that is activated by an auxiliary sensing device.
Figure 2:
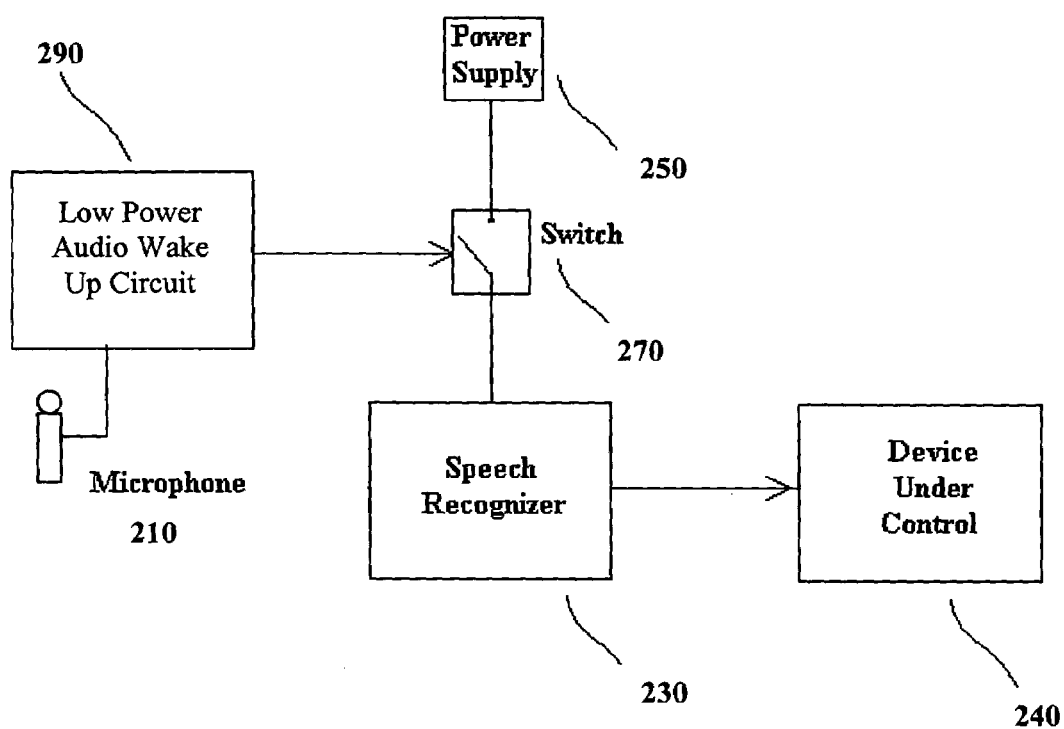
FIG. 2 illustrates a wake up circuit according to one embodiment of the present invention.

FIG. 2 illustrates an apparatus including a power control circuit according to one embodiment of the present invention. A speech recognition system may include a microphone 210 coupled to a speech recognizer 230 through a low power audio wake up circuit 290. Low power audio wake up circuit 290 may operate in two modes. In a first mode, the system is in a standby or sleep state and the wake up circuit 290 draws very little current. In this state, switch 270 may be open, and power supply 250 may be decoupled from speech recognizer 230. Alternatively, switch 270 may reduce the power to speech recognizer 230 and recognizer 230 may be configured into a low power sleep state. Consequently, in the first mode, the system draws very little power. For example, in one embodiment, wake up circuit 290 and recognizer 230 are configured to draw very little current from power supply 250 while in the first state. However, wake up circuit 290 is able to receive and process an audio signal. When a signal is received, recognizer 230 reconfigures itself and wake up circuit 290 into a second state that is suitable for receiving and processing signals for speech recognition. In the second state, wake up circuit 290 receives and processes signals with higher resolution so that the processed signals can be analyzed by recognizer 230. Additionally, the recognizer is configured to be a fully functional recognizer and is taken out of its low power mode.

Figure 3:
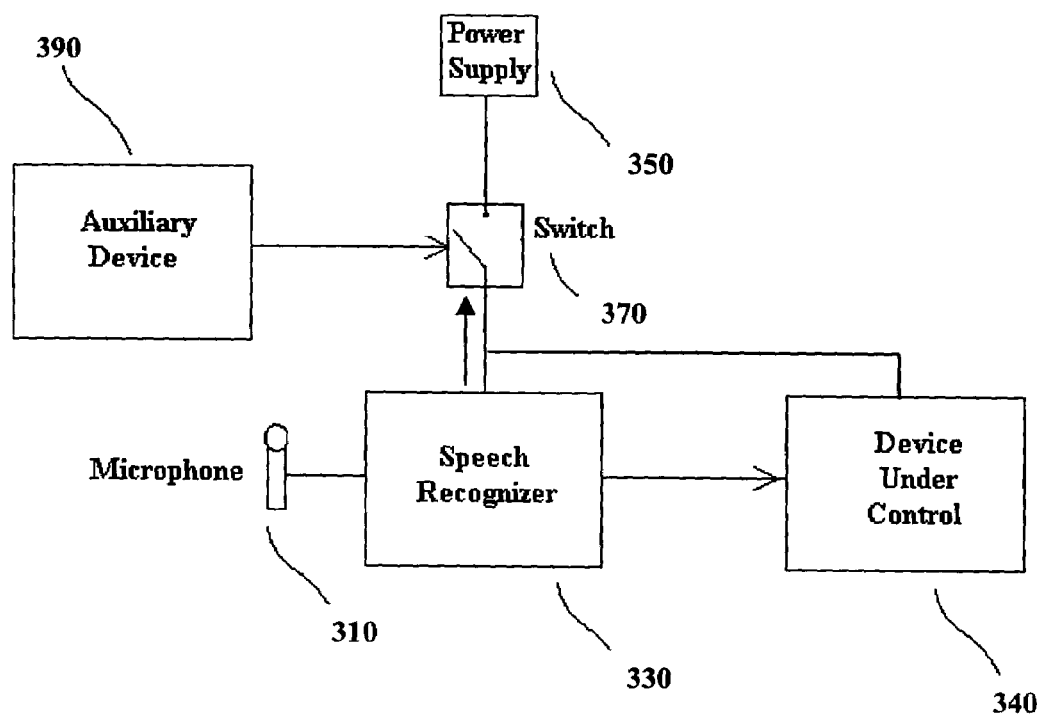
FIG. 3 illustrates an auxiliary sensing device controlling power to either a recognizer and/or a device under control according to another embodiment of the present invention.

FIG. 3 illustrates another embodiment of the present invention. Another problem associated with controlling speech recognition systems pertains to how the speech recognition system controls the power supplied to the device under control. In one embodiment, an auxiliary sensing device is used to control power to either recognizer 330 or device under control 340 or both. For example, in one embodiment a recognition system may operate in multiple modes. In one mode, power control switch 370 is controlled by auxiliary sensing device 390 to control power to device under control 340. In another mode, switch 370 is controlled by auxiliary sensing device 390 to control power to recognizer 330. In yet another mode, switch 370 is controlled by recognizer 330 to control power to device under control 340. In yet another mode, switch 370 is controlled by both auxiliary sensing device 390 and recognizer 330 to control power to device under control 340. Recognizer 330 may include control logic or a processor that generates information or electronic signals corresponding to the mode the system operating in. Based on such information or signals, the system may be configured to operate in any one or a combination of the above described modes.

Figure 4:
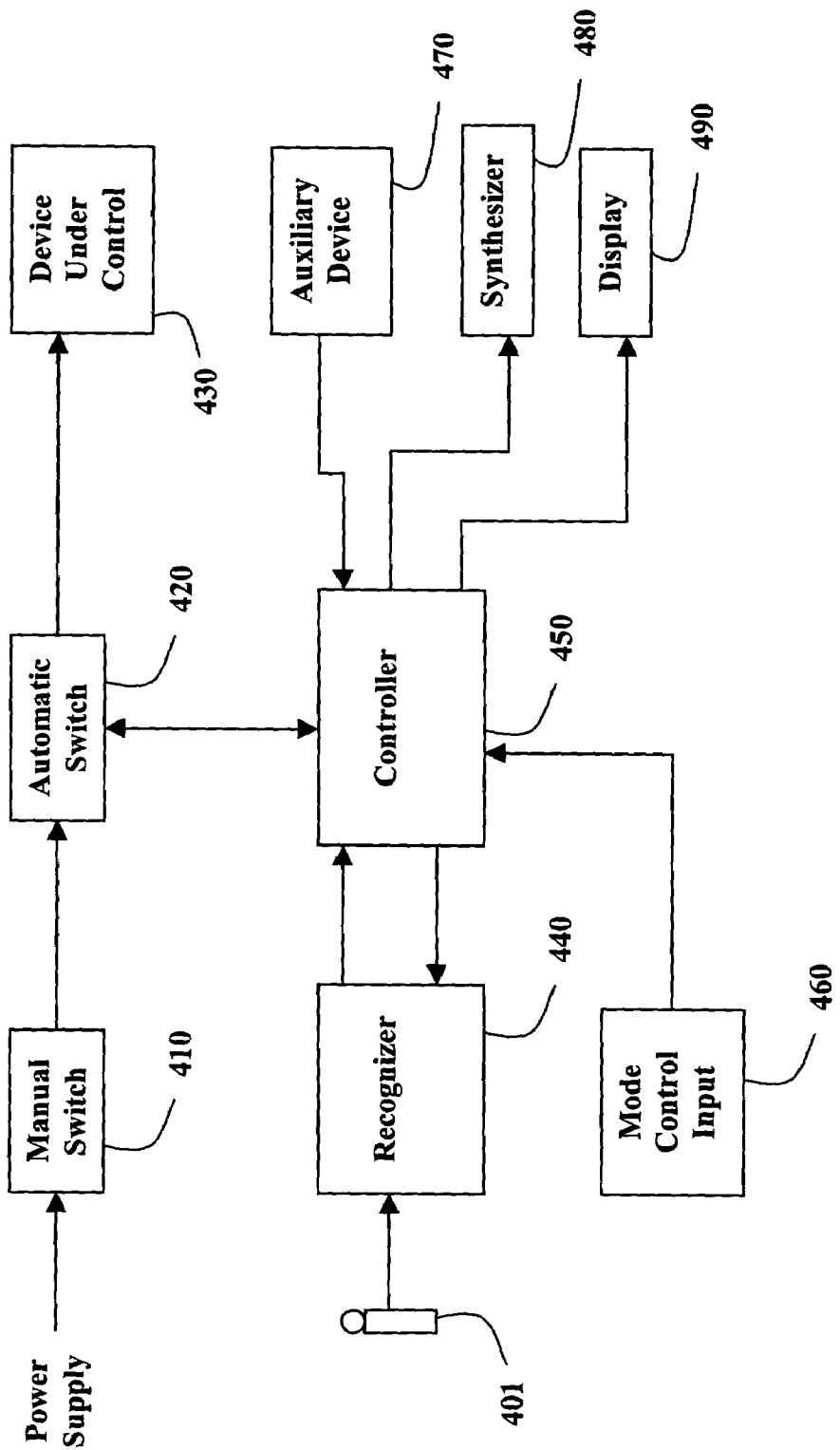
FIG. 4 illustrates an apparatus for controlling a device by voice commands according to another embodiment of the present invention.

FIG. 4 illustrates an apparatus for controlling a device by voice commands according to another embodiment of the present invention. Microphone 401 is coupled to recognizer 440 for receiving speech input signals, analyzing the input speech signals against a recognition set and producing recognition results. Recognizer 440 is coupled to a controller that controls the operation of the system based on the recognition results and other system inputs. Controller 450 is coupled to an automatic power control switch 420. In one embodiment, automatic switch 420 may be a device that can control the amount of signal (e.g., voltage or current) passed between at least one input and at least one output. The amount of signal may be controlled in accordance with and analog or digital control signals from controller 450. Automatic switch 420 is coupled between a device under control 430 and the devices power supply. A manual power control switch 410 may also be included in series with automatic switch 420 for further flexibility.

Controller 470 may also be coupled to an auxiliary sensing device 470. Automatic switch 420 may be controlled by inputs received in controller 450 from recognizer 440 and auxiliary sensing device 470. Consequently, power to the device under control may be influenced by recognition results or auxiliary inputs individually to in combination.

Controller 470 may also be coupled to mode control input 460. Mode control input may allow a user to configure the system to perform different algorithms corresponding to particular modes of operation. The algorithms may influence how recognition results from recognizer 440 are used, alone or in combination with, inputs from auxiliary sensing device 470. In one embodiment, controller 450 is coupled to synthesizer 480 for generating synthesized speech to communicate with a user (e.g., for prompting, instructing, or having dialogs). Controller 490 may also be coupled to a display 490 for presenting visual images to a user to enhance the interactive aspects of particular embodiments of the invention.

Figure 5:
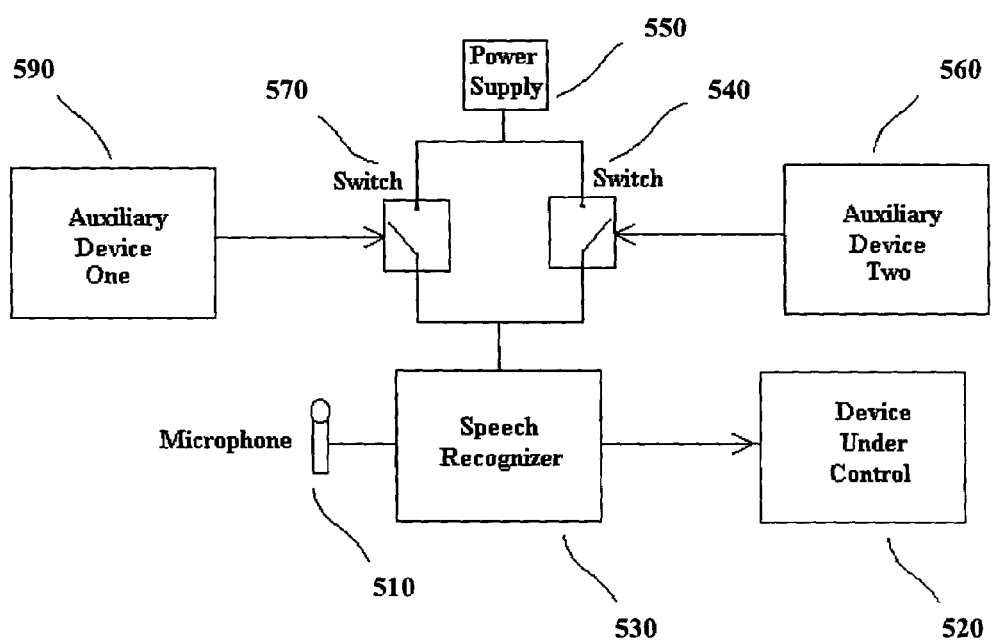
FIG. 5 is a block diagram of a device under the control of a speech recognizer that is activated by either of two auxiliary sensing devices.

FIG. 5 illustrates another embodiment of the present invention that overcomes limitations of the current art. In this figure, there are two auxiliary sensing devices that operate in parallel to control the power to the speech recognizer. The first auxiliary sensing device 590 may be a light sensor, for example, and the second auxiliary sensing device 560 may be a monitor of the current through device under control 520 (e.g., a light element in a lamp). For example, power may be fed to speech recognizer 530 through switch 570 when the room is dark and through switch 540 when the lamp is lit. These are the only two cases for which it may be desired to control the lamp operation by voice command. Thus, a person may control the lamp by voice command in the middle of the night in order to turn it on, and again, in order to turn it off at a later time. This circuit could also enable the resetting of the lamp and the turning off of the recognizer when the sun rises through either a timing device or periodic checks by turning off the lamp and turning on the light sensor (not shown in detail for simplicity).

Auxiliary sensing device two 560 of FIG. 5 might also be a low power circuit that causes switch 540 to close on receipt of a specific sound such as a whistle, some number of claps, or a continuous sound lasting one or two seconds. In this case, a person could switch a battery powered device by clapping twice, for example, after which and within some limited amount of time, the person spoke the appropriate command to switch the device. If the command was not spoken within this limited amount of time, auxiliary sensing device two 560 would cause switch 540 to open and the user would have to clap again to cause switch 540 to close. This method of operation limits the false acceptance of commands on extraneous noise because they must occur within the limited amount of time, and also conserves on battery drainage through the low power mode during which it is listening for the wake up clapping.

Auxiliary sensing device two 560 of FIG. 5 might also be a timer that starts in response to the lamp going on (via a connection that is not shown in FIG. 5 for simplicity). When it starts its timer, switch 540 is closed until it times out, after which switch 540 is opened and auxiliary sensing device two 560 interrupts the power to the lamp (via a connection that is not shown in FIG. 5 for simplicity). At this time the room goes dark, switch 570 is closed by auxiliary sensing device one 590, and speech recognizer 530 is powered to receive further commands.

It is possible within the scope of the invention to consider more than two switches in parallel. For example, one possible embodiment could have three switches in parallel, each of which is controlled by either light in the room, current through the lamp or by making specific sounds such as a whistle or hand claps. Another embodiment could include the presence of devices (microprocessors, DSPs, dedicated logic) to perform various logic. Boolean or other logic functions associated with the settings of the switches either alone or in combination with timers and other circuitry functions.

Figure 6:
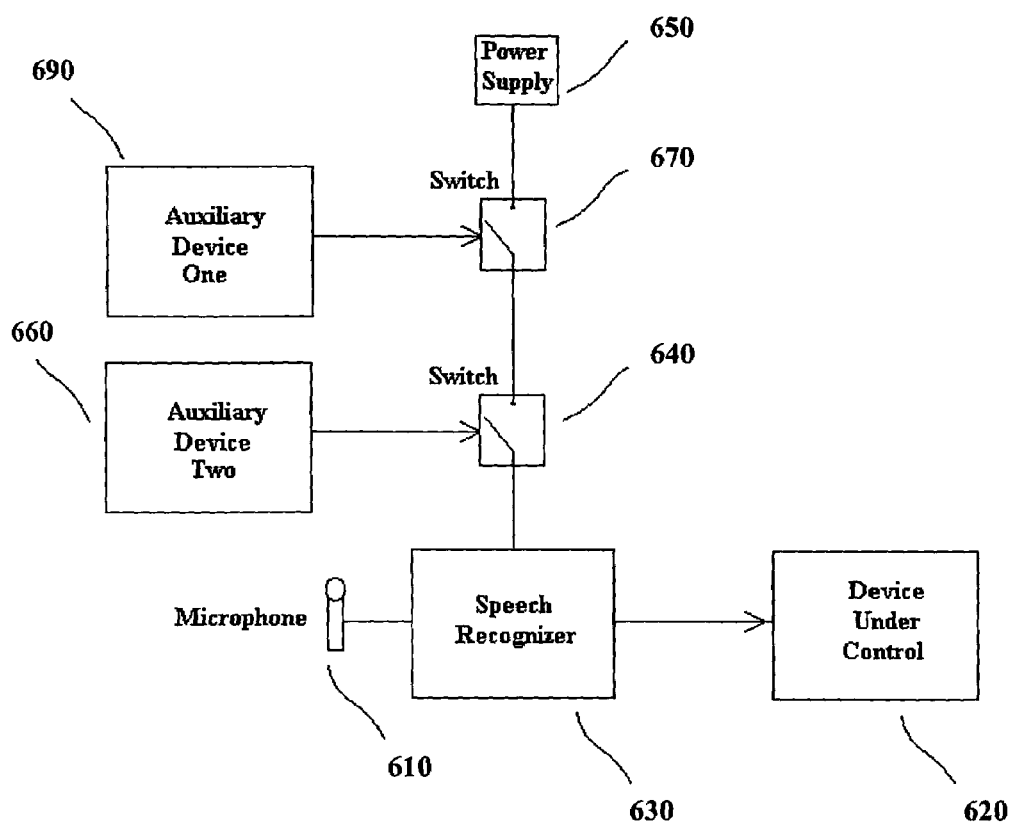
FIG. 6 is block diagram of a device under the control of a speech recognizer that is activated by both of two auxiliary sensing devices.

FIG. 6 describes another embodiment of the invention in which switch 670 and switch 640 are in series rather than in parallel, such as in FIG. 5. In this case, both switches must be closed for power from power supply 650 to activate speech recognizer 630. This configuration might apply to the case where device under control 620 is the door locking/unlocking mechanism for an automobile, auxiliary sensing device one 690 might be a sensor that detects when the motor is off, and auxiliary sensing device two 660 might be a proximity detector. In this case, for power to be applied to speech recognizer 630 through switches 670 and 640 the motor must be off and a person must be near the car. Another case could be that auxiliary sensing device two 660 is a specific sound detector, such as a whistle or clap detector. In this case the car motor must be off and a person must make a specific sound such as handclaps in order to power on speech recognizer 630 and enable it to unlock the doors of the car when the correct command is spoken into microphone 610.

In the above illustrations, switches 670 and 640 control the electric power to speech recognizer 630 and device under control 620. It is possible within the scope of the invention, to achieve the same results by means other than controlling the power to these devices. For example, switches 670 and 640 could control the power to microphone 610, or they could control another switch that disconnects microphone 610 from speech recognizer 630. Or they could send logic pulses to speech recognizer 630 that determines whether it is in an active or passive state.

Figure 7:
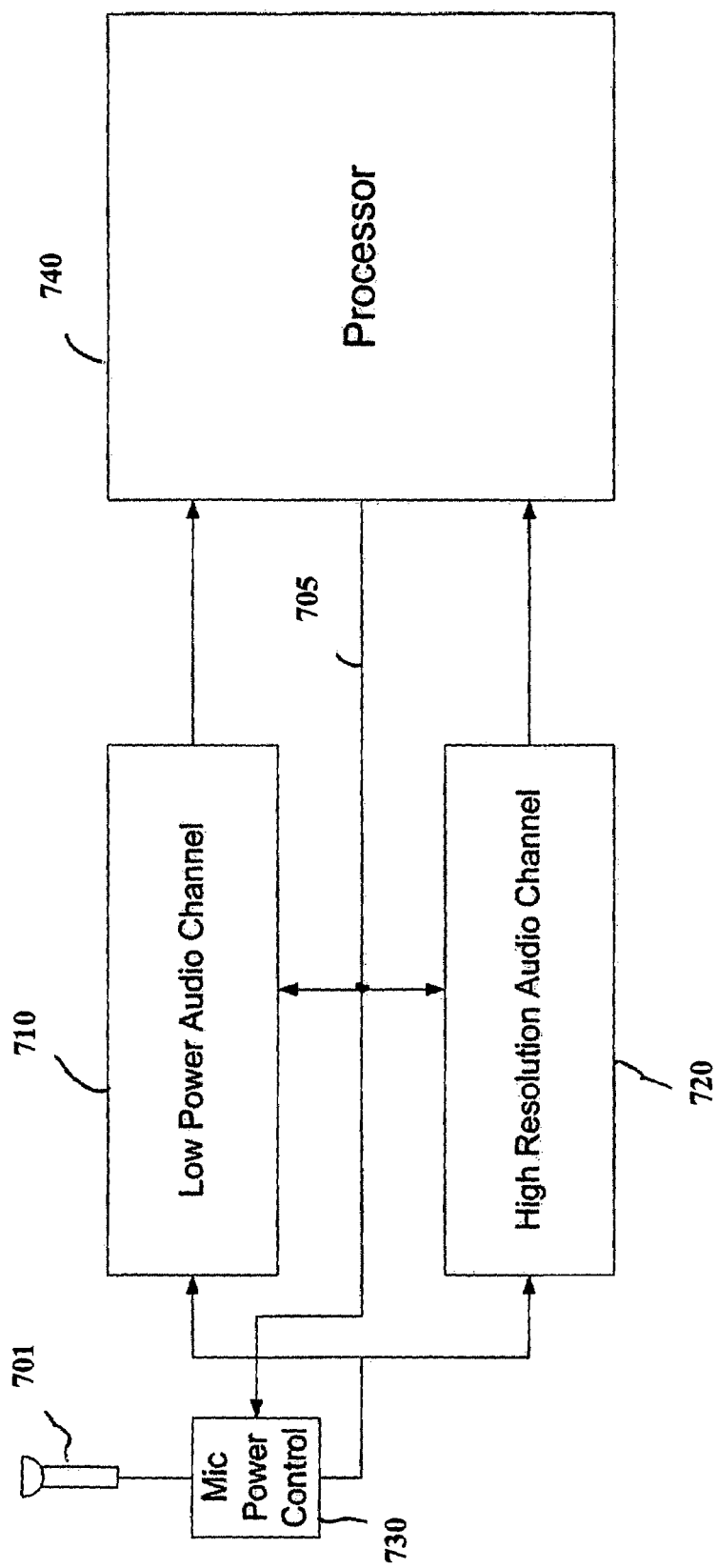
FIG. 7 illustrates an audio input circuit that may be utilized in one embodiment of the present invention.

Embodiments of the present invention may include a low power audio wake up circuit. FIG. 7 illustrates a low power audio wake up circuit according to one embodiment of the present invention. FIG. 7 includes a low power audio channel 710 and a high resolution audio channel 720. A microphone 701 is used to receive audio input signals. The output of microphone 701 is coupled to a microphone power control circuit 730. The output of microphone power control circuit 730 is coupled to both low power audio channel circuit 710 and high resolution audio channel circuit 720. The outputs of low power audio channel 710 and high resolution audio channel circuit 720 are coupled to a processor 740. The processor includes a signal line 705 that is coupled to the microphone power control circuit 730, the low power channel 710 and the high resolution channel 720. An audio input signal is received in the microphone 701 and transmitted electronically to low power audio channel circuit 710 and high resolution audio channel circuit 720. In a first mode of operation, the high resolution audio channel circuit 720 is powered off and the low power audio channel circuit 710 is powered on. Thus, the signal received from microphone 701 is processed only by the low power audio channel circuit 710 and not the high resolution audio channel circuit 720. The processed signal from the low power channel 710 is coupled to the processor 740 for further audio recognition processing. In the first mode of operation, the processor disables the high resolution audio channel 720 (i.e., turns it off) and enables the low power channel 710 (i.e., turns it on). In this mode, processor 740 may enter a low power sleep state to reduce power consumption. The audio signal is received on microphone 701 and translated into an electronic signal and passed to the low power audio channel 710. The low power audio channel 710 detects the signal and transmits a detection signal to processor 710. Upon receiving the detection signal from the low power channel 710, processor 740 reconfigures the system using signal lines 705 to turn the high resolution audio channel 720 on and reconfigure the microphone power control circuit 730 so that the higher resolution signal can be passed through the microphone through the high resolution audio channel 720 and into the processor for high resolution audio recognition processing.

Figure 8:
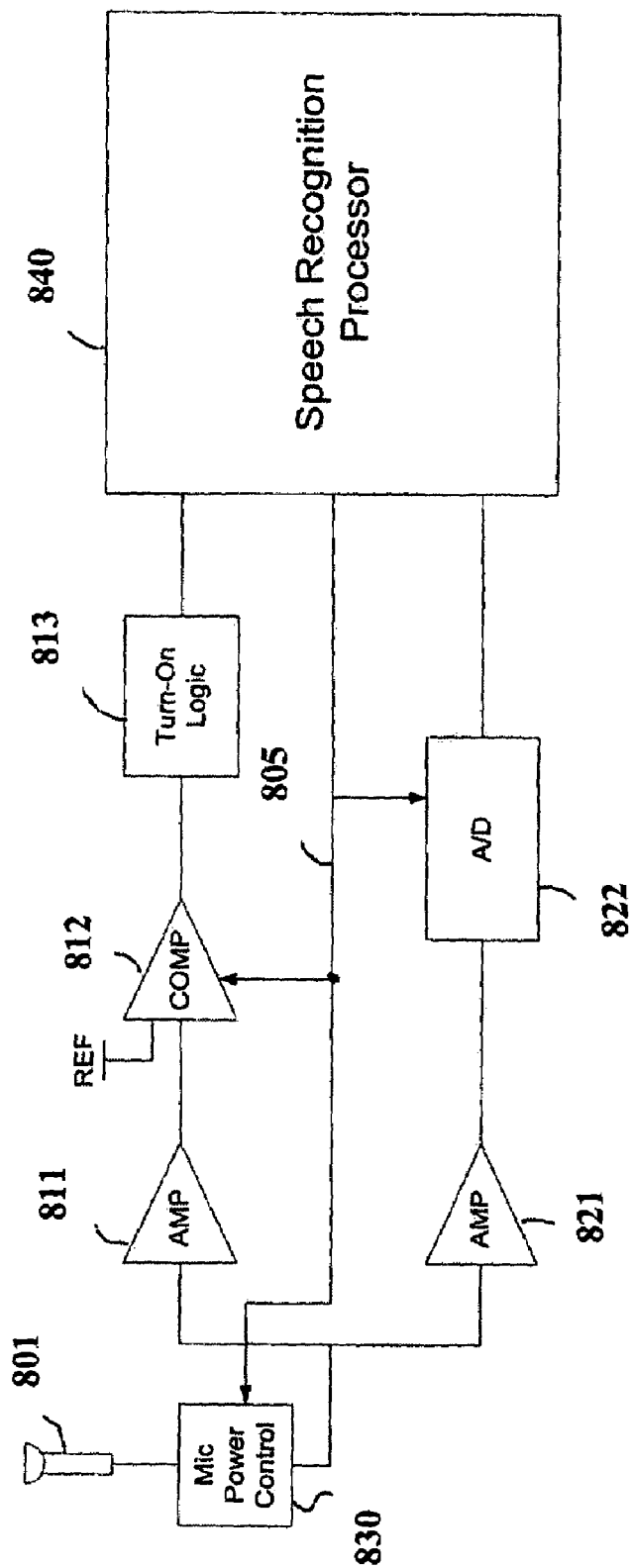
FIG. 8 illustrates an audio input circuit that may be utilized in another embodiment of the present invention.

FIG. 8 illustrates a specific example of an audio wake up circuit. Audio wake up circuit includes a microphone 801, a microphone power control circuit 830, a first low power channel including amplifier 811, comparator 812 and turn-on logic 813. A second high resolution audio channel includes amplifier 821 and an A/D 822 (i.e., "analog to digital converter"). The low power channel and the high resolution channel are both connected in parallel to processor 840. In one specific embodiment of the present invention, processor 840 is a speech recognition processor optimized for performing speech recognition operations. Processor 840 includes signal line 805 for configuring comparator 812, analog to digital converter 822 and microphone power control circuit 830 into one of two modes. In a first mode, processor 840 generates configuration signals that are received by A-D converter 822 and optionally amplifier 821 for turning these circuits off when the speech recognition processor is not conducting the speech recognition process. In this mode of operation, comparator 812 and optionally turn on logic 813 and amplifier 811 are turned on. While in this mode, any signals received at the microphone 801 will be processed by amplifier 811, and the output of amplifier 811 is compared to a reference voltage at comparator 812. If an input signal is above a certain threshold, comparator 812 will trigger an output signal which will be transmitted to turn-on logic 813. Turn-on logic 813 will then transmit a signal to speech recognition processor 840 telling the processor that an input signal is being received. In response to receiving the signal from turn-on logic 813, speech recognition processor 840 will generate control signals on lines 805 to enable A-D converter 822 and optionally amplifier 821 and thereby process the audio signals in a high resolution channel.

It will be apparent to those skilled in the art that the low power channel including amplifier 811, comparator 812 and turn on logic 813 could be designed using low quiescent current circuits that consume very little current, and therefore power, during normal modes of operation. Additionally, those skilled in the art could appreciate that the high resolution channel including amplifier 821 and analog to digital converter 822 could be designed using high resolution circuit techniques that will allow electrical signals received at the input of amplifier 821 from microphone 801 to be processed by the amplifier 821 and analog-to-digital converter 822 to produce accurate electrical representations of the audio signal that can be used for speech recognition purposes. The signals can then be used by processor 840 to perform speech recognition operations and recognize patters of speech within the electrical signals received and processed by analog to digital converter 822. For example, embodiments of the present invention may be advantageous where the power consumption in the low power channel is at least one-tenth the power consumption of the high resolution channel.

Figure 9:
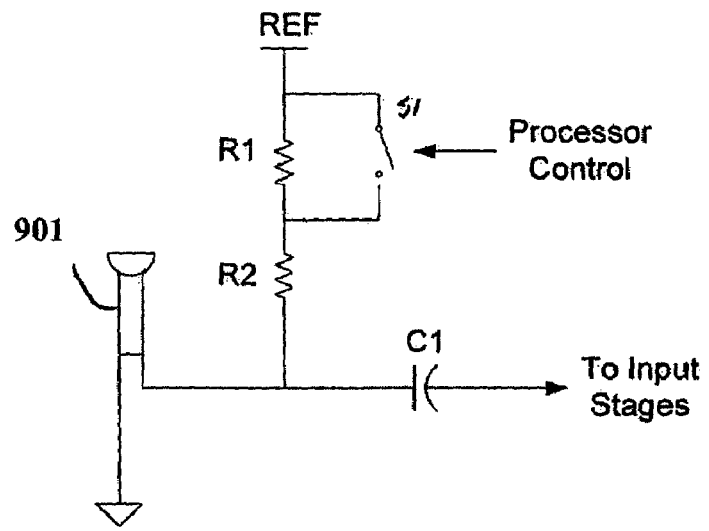
FIG. 9 illustrates a microphone power control circuit that may be used in one embodiment of the present invention.

FIG. 9 is a specific example of a microphone power control circuit according to one embodiment of the present invention. A microphone 901 can be biased at two different levels by using a resistor network comprised of resistors R1 and R2 and a switch S1. In a first mode of operation, the microphone is biased by connecting one of its terminals through both resistors R1 and R2 to a reference voltage. The biasing of the microphone can be changed by closing the switch S1 and thereby removing resistor R1 from the circuit. This switch, for example, could be controlled by an external processor such as processor 740 of FIG. 7. The acoustical signals received at the input of microphone 901 will be translated into electrical signals and passed through capacitor CI to other circuits in the system.

Figure 10:
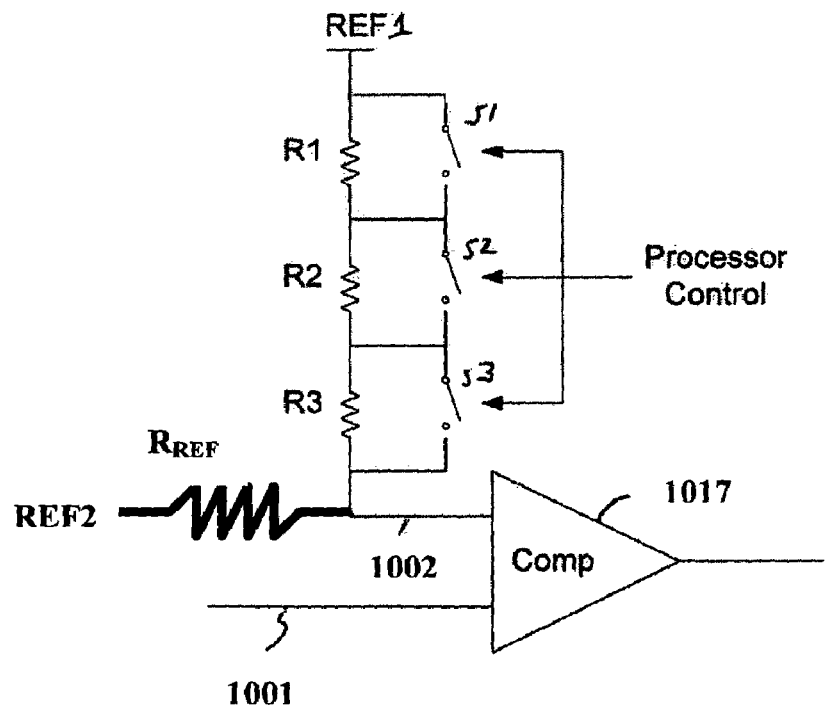
FIG. 10 illustrates a programmable comparator circuit that may be used in embodiments of the present invention.

FIG. 10 illustrates a programmable comparator circuit that may be used in embodiments of the present invention. A comparator 1017 has a first terminal 1001 for receiving signals to be processed. The second terminal 1002 is coupled to a reference voltage through a plurality of resistors R1, R2 and R3. The reference voltage and the resistors will set the threshold on the comparator. If the switches S1, S2 and S3 are all closed then any signal on 1001 having a voltage greater than the reference (i.e., "REF1") will cause the output of the comparator to go high. Similarly, any signal on 1001 having a voltage below the reference will cause the output of comparator 1017 to go low. By adjusting the switches S1, S2 and S3, the voltage at node 1002 can be adjusted. Consequently, the voltage at which the comparator will switch is also adjusted. Switches S1, S2 and S3 can also be controlled by an external processor such as processor 740 of FIG. 7, for example. By providing an adjustable comparator circuit as shown in FIG. 10, embodiments of the present invention can be programmed to generate a wake up signal at different threshold levels of input signals. This can be done by a user or automatically under software control.

Figure 11:
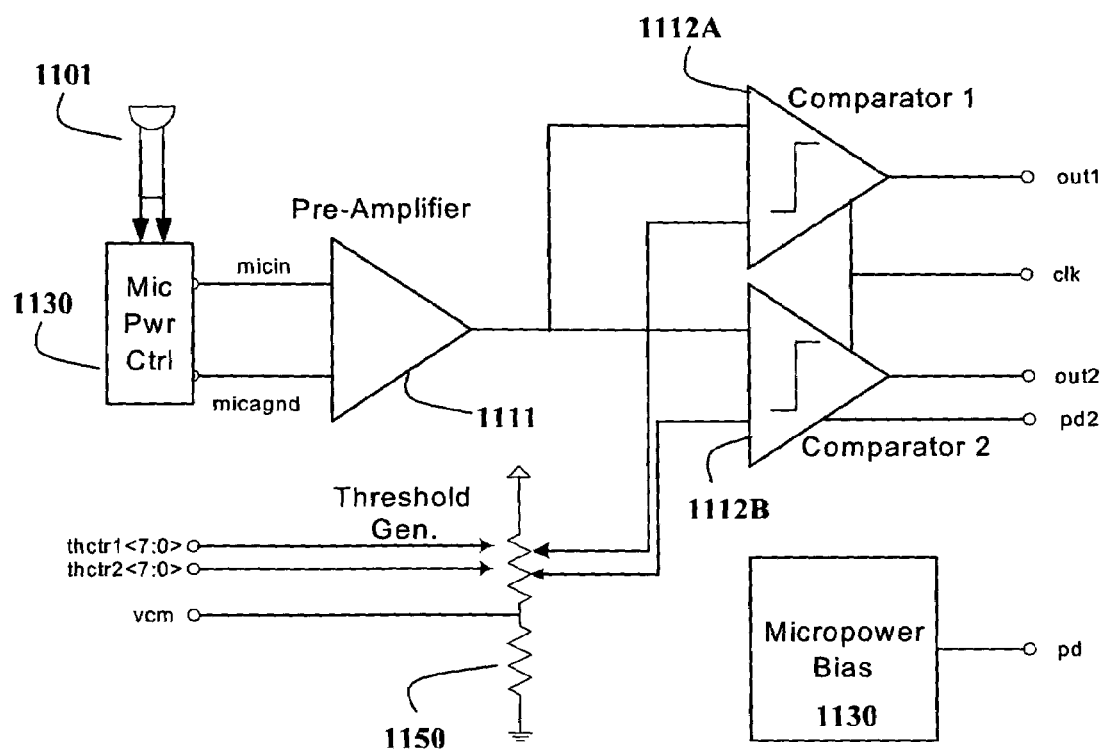
FIG. 11 illustrates a circuit according to another embodiment of the present invention.
Figure 12:
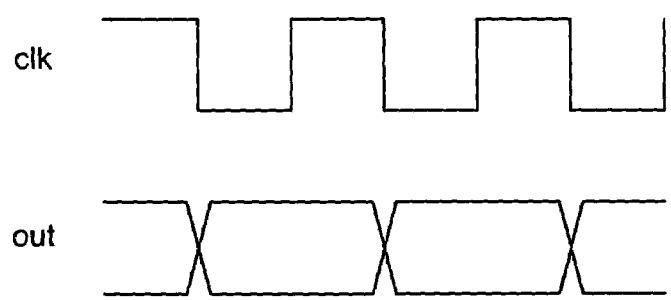
FIG. 12 illustrates a timing diagram for the circuit of FIG. 11.

FIG. 11 illustrates a circuit according to another embodiment of the present invention. A microphone 1101 is coupled to a microphone power control circuit 1130. The output of the microphone power control circuit is coupled to a pre-amplifier 1111. The output of pre-amplifier 1111 is coupled to a twin comparator network including comparators 1112A and 1112B. Comparator 1112A includes a first input coupled to the output of the pre-amplifier. A second input of comparator 1112A is coupled to a resistor network 1150. Resistor network 1150 is coupled in series between two different reference voltages (e.g., Vcm and ground). The second input to comparator 1112A is coupled to a tap off the resistor network. Similarly, comparator 1112B has a first input coupled to the output of pre-amplifier 1111 and a second input coupled to a tap of resistor network 1150. The voltages on the comparators can be controlled digitally using signal lines THCTR1 [7:0] and THCTR2 [7:0]. It is to be understood that multiple digital signal lines are included in each of these signal lines and that other configurations are possible. Voltage generated by resistor network 1150 is also controlled by a common mode voltage applied to resistor network VCM. In one embodiment of the present invention, comparators 1112A and 1112B are clock comparators and receive a clock signal CLK. FIG. 12 illustrates clock signal CLK and an output signal labeled OUT. A micropower bias circuit 1130 may be included for operating the above circuits at very low power consumption levels. Micropower circuit 1130 may include a powerdown input for shutting down power to the comparator, preamplifier and other circuits in the low power channel.

Figure 13:
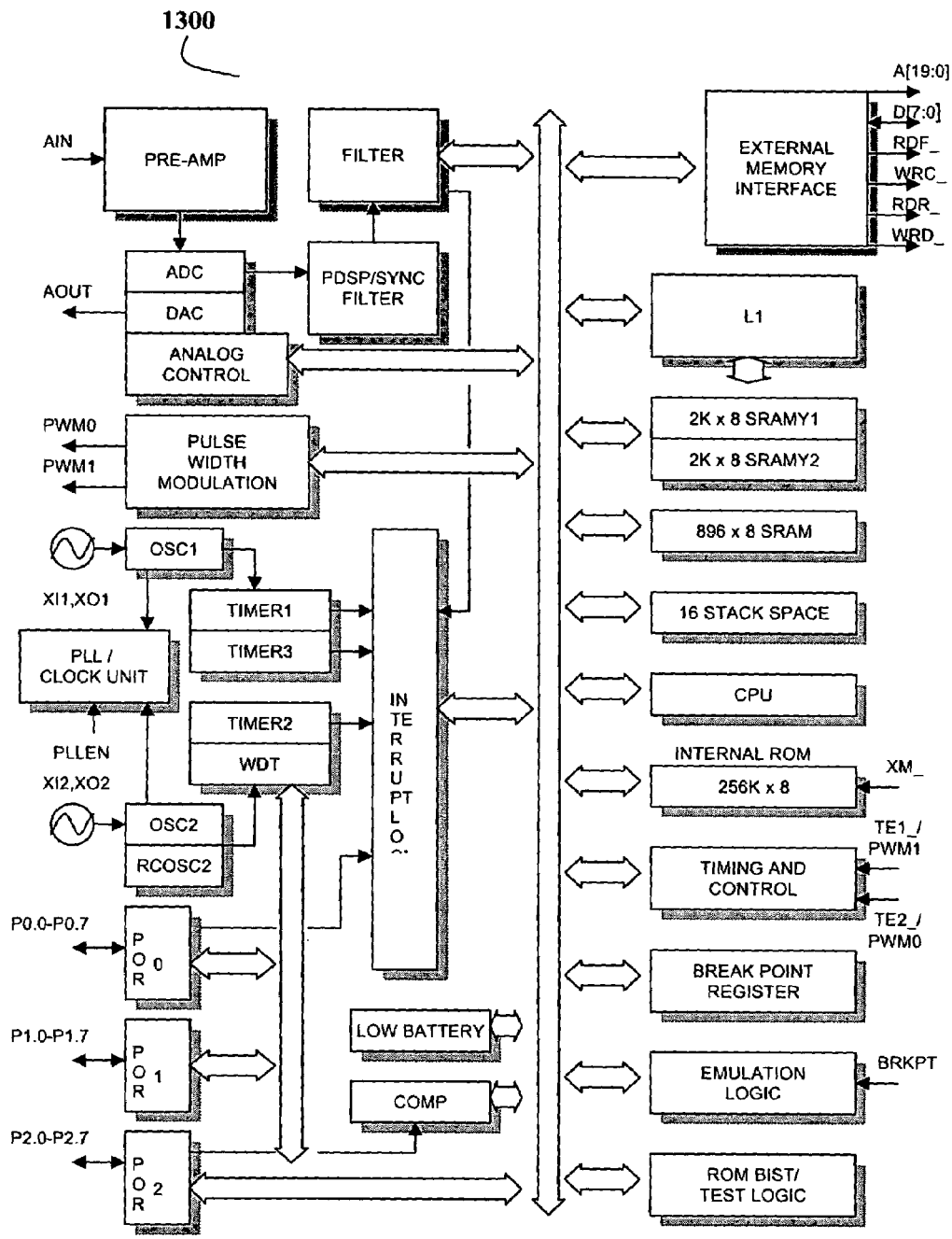
FIG. 13 illustrates a processor that may be used in embodiments of the present invention.

FIG. 13 illustrates a processor that may be used in embodiments of the present invention. Processor 1300 may be used to implement speech recognition operations on signal received from the analog to digital converter in a high resolution channel according to embodiments of the present invention. Among other features, processor 1300 may include an external memory interface and a vector processor (labeled L1) coupled to SRAM Y1 and SRAM Y2. Processor 1300 may also include a plurality of ports (e.g., port 0, 1 and 2) for communicating data between the processor and external components. Those skilled in the art will understand that processor 1300 is merely exemplary of one processor that may be used to practice the present invention.

Figure 14:
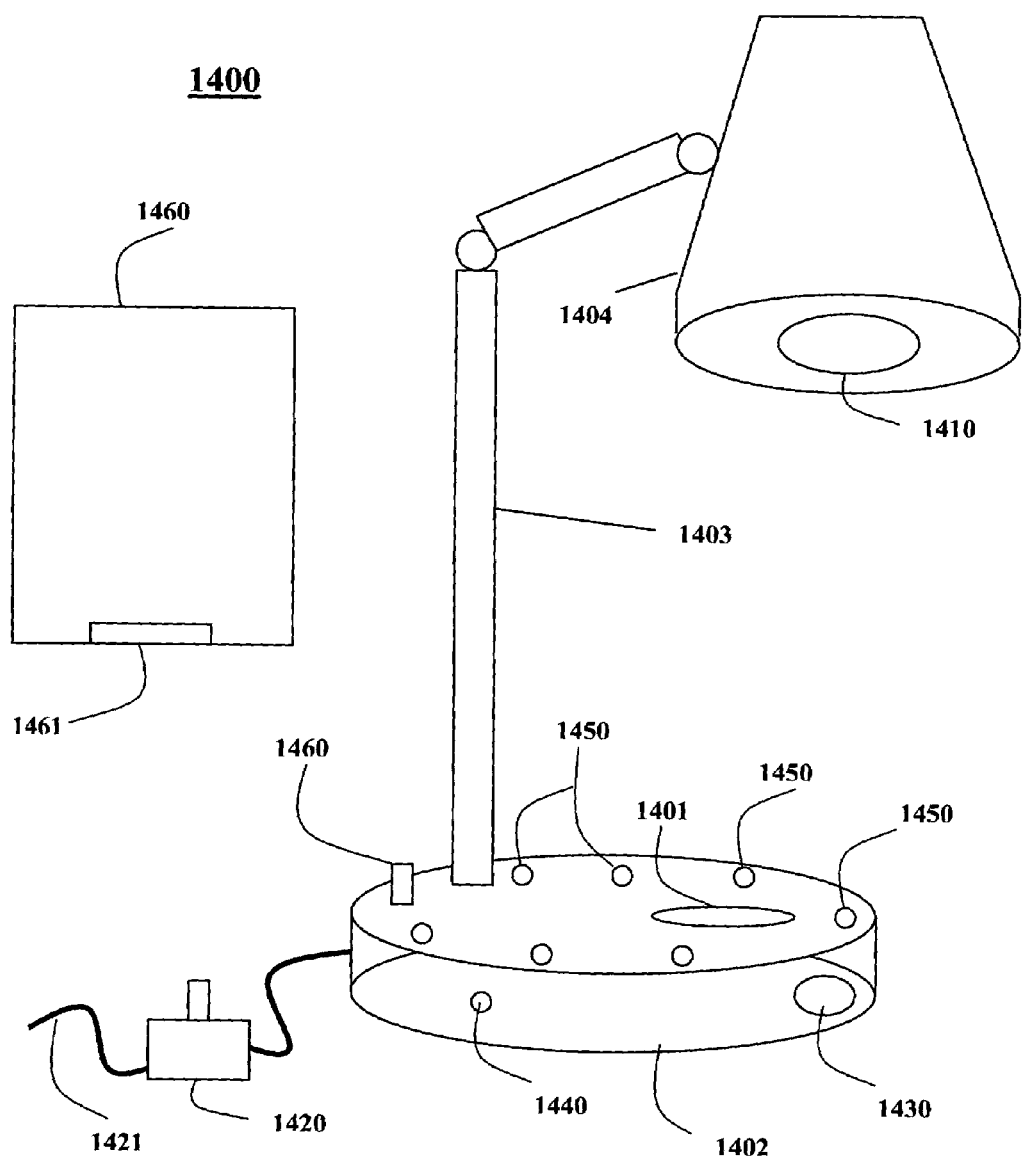
FIG. 14 is an example of a voice-controlled lamp according to one embodiment of the present invention.

FIG. 14 is an example of a voice-controlled lamp according to one embodiment of the present invention. Voice-controlled lamp includes a base 1402 including a speaker 1401, a microphone input 1430 and an auxiliary sensor 1440 (e.g., a light sensor). The base may be the housing for circuitry according to one embodiment of the present invention. Base 1402 may also include a mode control switch 1460 and LEDs 1450. Lamp 1400 further includes post 1403, lampshade 1404 and light element 1410 (e.g., a lightbulb). Power to the lamp is received on power cord 1421, which may further include a manual switch 1420. Embodiments of the present invention may further include a lamp attachment 1460. Lamp attachment 1460 may be movably attached to the lamp by a magnet 1461. Other forms of movable attachment such as Velcro may also be used. Lamp attachment 1460 may include a figurine or a clock for example.

Figure 15:
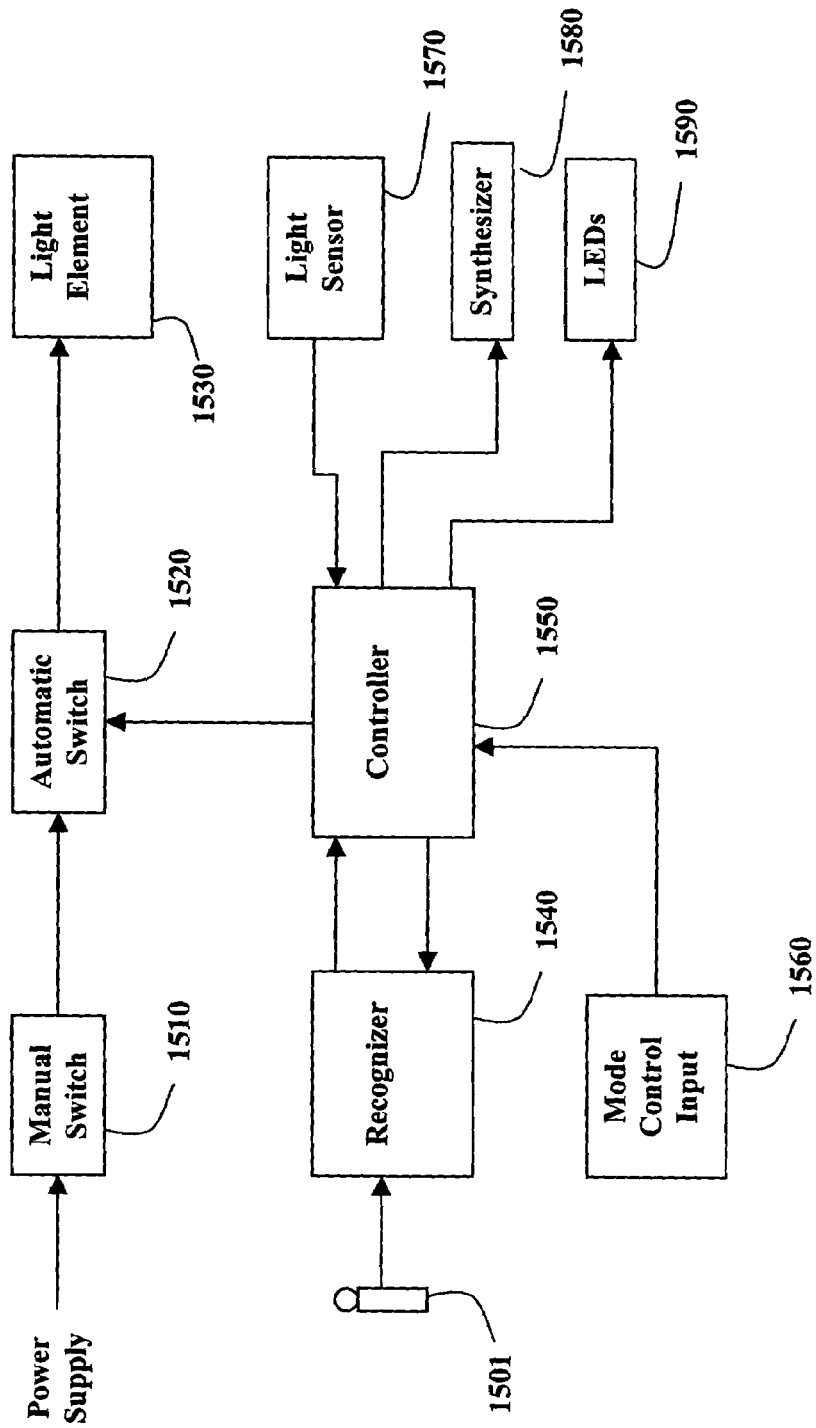
FIG. 15 illustrates a system for controlling a lamp by voice commands according to another embodiment of the present invention.

FIG. 15 illustrates a system for controlling a lamp by voice commands according to another embodiment of the present invention. Microphone 1501 is coupled to recognizer 1540 for receiving speech input signals, analyzing the input speech signals against a recognition set and producing recognition results. A low power audio wake up circuit (not included here may also be included between microphone 1501 and recognizer 1540. Recognizer 1540 is coupled to a controller 1550 that controls the operation of the system based on the recognition results and other system inputs. Controller 1550 is coupled to an automatic power control switch 1520 that can control the amount of power passed between at least one input and at least one output. The amount of signal may be controlled in accordance with and analog or digital control signals from controller 1550. Automatic switch 1520 is coupled between a light element 1530 and the power supply. A manual switch 1510 may also be included in series with automatic switch 1520 for further flexibility.

Controller 1570 may also be coupled to an auxiliary sensing device, such as a light sensor 1570. Automatic switch 1520 may be controlled by inputs received in controller 1550 from recognizer 1540 and light sensor 1570. Consequently, power to the light element may be influenced by recognition results or external light levels individually to in combination. Controller 1570 may also be coupled to mode control input 1560. Mode control input may allow a user to configure the system to perform different algorithms corresponding to particular modes of operation as described below. In one embodiment, controller 1550 is coupled to synthesizer 1580 for generating synthesized speech to communicate with a user (e.g., for prompting, instructing, or having dialogs). Controller 1590 may also control LEDs 1590 for presenting visual images to a user to enhance the interactive aspects of particular embodiments of the invention.

Figure 16:
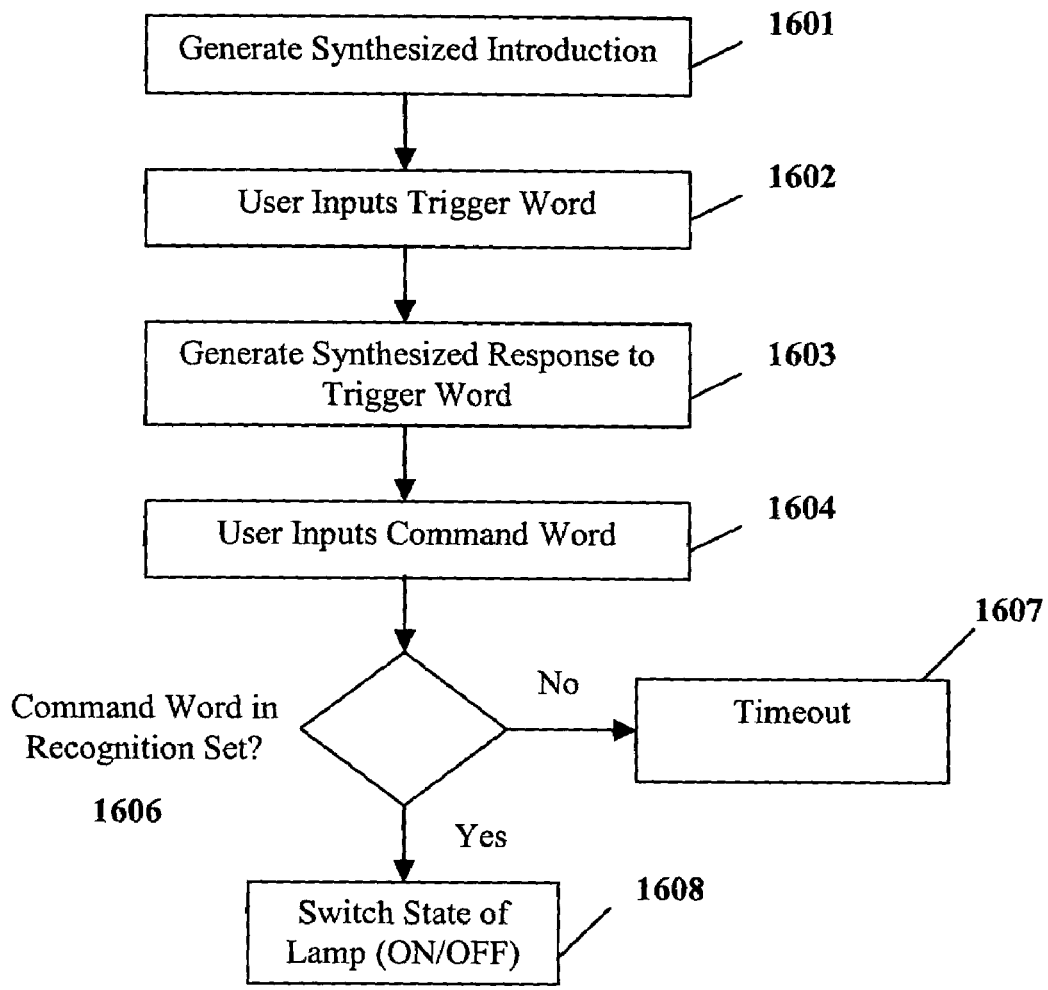
FIG. 16 illustrates a method of controlling a lamp by voice commands according to one embodiment of the present invention.

FIG. 16 illustrates a method of controlling a lamp by voice commands according to one embodiment of the present invention. At 1601, the system generates a synthesized speech introduction, such as a greeting, a tag line, instructions or a listing of acceptable trigger words. At 1602, a user inputs a trigger word. At 1603, the system generates synthesized speech response to the trigger word. At 1604, the user inputs a command word. At 1606, the system determines whether or not the command word is in the recognition set. If the command word is not in the recognition set, the system may timeout at 1607 and go back to an initial state. If the command word is in the recognition set, the system may modify the state of the lamp at 1608. For example, in one embodiment the lamp may be "toggled" between "ON" and "OFF" in response to receiving a particular command word in the recognition set (e.g., "Lightswitch").

Figure 17:
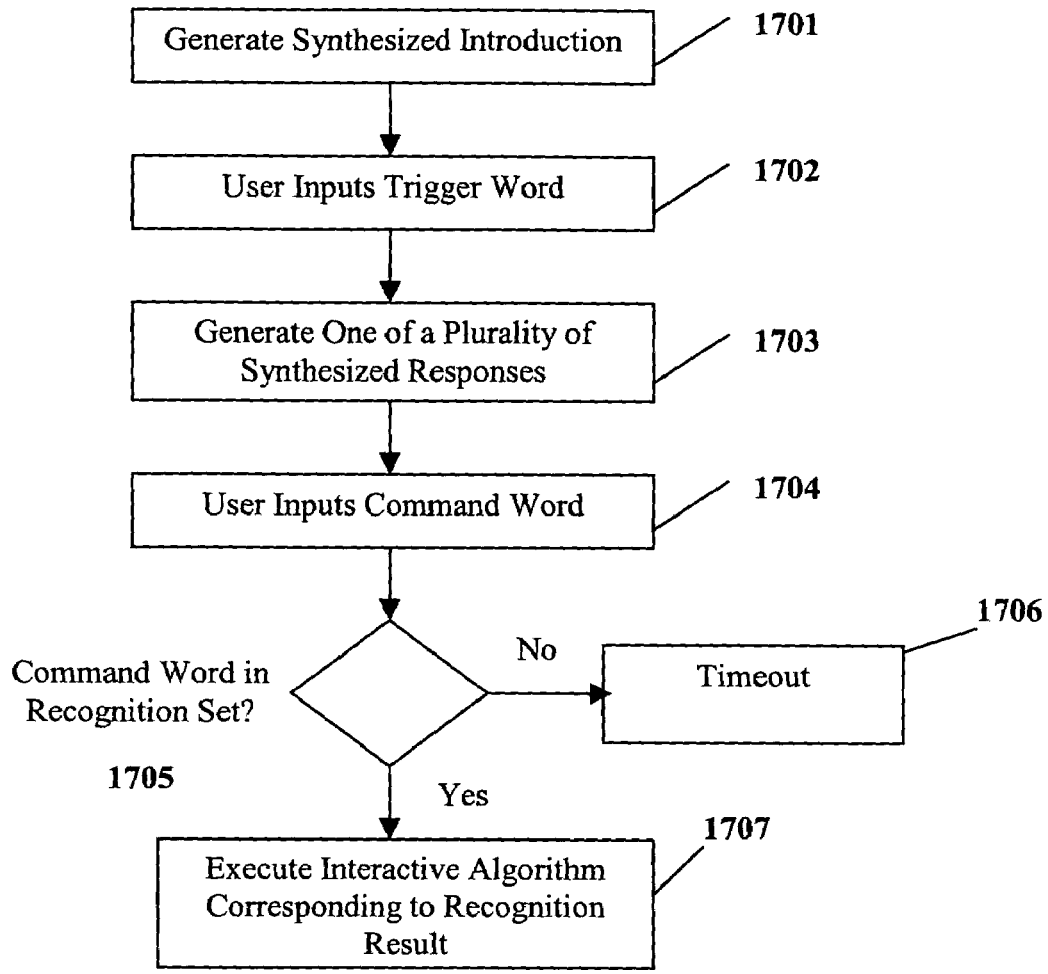
FIG. 17 illustrates a method of controlling a lamp by voice commands according to another embodiment of the present invention.

FIG. 17 illustrates a method of controlling a lamp by voice commands according to another embodiment of the present invention. At 1701, the system generates a synthesized introduction. At 1702, the user may input a trigger word. At 1703, the system generates one of a plurality of synthesized responses. At 1704, the user inputs a command word. At 1705, the system determines whether or not the command word input by the user is in the active recognition set. If the user's command word is not in the recognition set, the system may timeout at 1706 and go back to an initial state. If the command word is in the recognition set, the system may execute an interactive algorithm corresponding to the command word input by the user at 1707.

Figure 18:
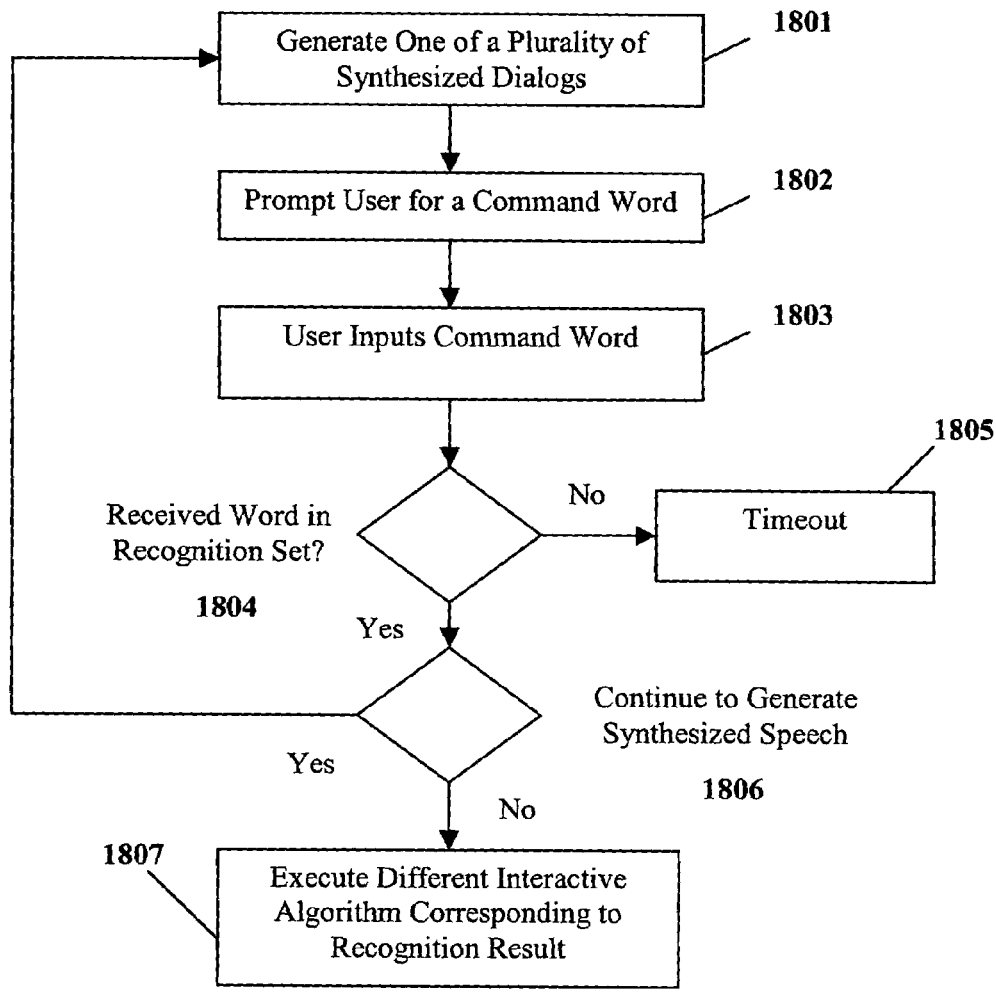
FIG. 18 illustrates a method of controlling a lamp by voice commands according to another embodiment of the present invention.

FIG. 18 illustrates a method of controlling a lamp by voice commands according to another embodiment of the present invention. In one embodiment, the present invention provides a system for simulating conversation with the lamp, which may be useful for applications directed toward children who are frightened by the dark. For example, at 1801, the system may generate one of a plurality of synthesized dialogs. At 1802, the system prompts a user for a command word. At 1803, the user may input the command word. At 1804, the system determines whether or not the command word is in the recognition set. If the command word is not in the recognition set, the system may timeout at 1805 and go back to an initial state. If the command word is in the recognition set, the system may next determine if the particular command word input by the user instructs the system to continue to generate synthesized dialog at 1806 (e.g., the user wants to have further simulated conversation with the system). If the particular command word input by the user instructs the system to continue to generate synthesized dialog, the system returns to 1801. However, if another command word is received, the system executes a different interactive algorithm corresponding to the particular recognition result (i.e., the particular command word in the recognition set spoken by the user and recognized by the system).

Multiple methods such as the ones described in FIGS. 16-19 may be implemented in as different modes in a single system. For example, in one embodiment, multiple methods may be programmed on into the system as algorithms in source code, and a mode controller (e.g., a mode control switch) may be used to indicate to the system which of multiple methods to perform. One mode may be a manual mode where the voice recognition features are turned off and the lamp operates as a conventional lamp. Other modes may include a "voicelight" mode or an "interactive" mode.

In voicelight mode, the system may generate synthesized speech. The speech may describe the mode that the lamp is in, and may further prompt the user for a trigger word (e.g., the synthesized speech may say, "You are in voicelight mode. To switch the lights on or off, say 'wake up.' Then, after a prompt say 'lightswitch.'"). The user may provide speech input into the microphone, which will be processed and analyzed by the speech recognizer. If the input corresponds to the trigger word (e.g., "wake up"), then the system may provide further synthesized speech to indicate to the user that the trigger word was recognized and that the system is waiting for a command word. The user may then enter a command word (e.g., lightswitch). If the command word is received and recognized, the system may toggle the lamp from "on" to "off" or from "off" to "on," for example.

In one embodiment, the auxiliary sensing device is a light sensor and the system has the ability to automatically reduce power to the light element so that the lamp is in a "dimmed" state (i.e., a nightlight) when the surrounding environment is dark and the light is below a threshold level. Thus, the light element may be in an "off" state, a "dimmed" state or a full "on" state in accordance with the application. In the voicelight mode, described above, the lamp may toggle between any two of these three states, for example.

In interactive mode, the system may execute a variety of different algorithms. For example, the system may start by generating synthesized speech that describes the mode and then waits for a trigger word. For example, in one embodiment the synthesized speech describes the "nightlight" mode that is continuously listening for a trigger word from a user. When a user desires to interact with the system, the user may speak the trigger word (e.g., "Wake up"). When the trigger word is recognized, the system may generate additional synthesized speech.

In one embodiment, the system stores a plurality of synthesized speech responses that may be generated in response to recognition of a trigger word. For example, the list of synthesized speech responses may comprise a response list including multiple possible responses that may be produced so that the user has the experience of simulated conversation (i.e., the user hears different responses over a period of time rather than the same one or two responses over and over). The system may keep track of the last response, or even the last two or more response, and select a response that has not been recently produced. In one embodiment, a list corresponding to the plurality of synthesized responses created and stored in memory (e.g., on the controller), and the system increments through the list as each response is synthesized. Thus, only after all the responses in the list have been played will a response be played again.

After the synthesized speech has been generated in response to recognition of the trigger word, the system may enter a "ready" state wherein the system waits for one of multiple voice commands and may execute different algorithms in accordance with the command received. For example, in one embodiment the system may have a recognition set with four command words: "lightswitch," "talk to me," "sleep guard" and "goodnight" (it is to be understood that trigger words and command words may be either individual words or phrases). If the user says "lightswitch," the system may toggle the light between its current state and another state (e.g., from off to on, off to dim, dim to off, dim to on, on to off or on to dim). If the user says "goodnight," the light may turn all the way off. If the user says "sleep guard," the controller may signal the LEDs on the lamp to activate. In one embodiment, the LEDs are activated according to a predefined pattern. Additionally, the system may synthesize audio signals such as the sound of snoring, for example, and/or play synthesized speech (e.g., "Now my snoozomatic room-detecto will let us sleep in piece").

Embodiments of the present invention may further include a command word that activates an algorithm that simulates a conversation. For example, when "talk to me" is recognized as the command word, the system may generate one of a plurality of synthesized responses. For example, if the recognized command word is "talk to me," the system may access (e.g., randomly) one of a plurality of responses. Some responses may prompt the user for input by synthesizing "you can say "lightswitch, talk to me, sleep guard or goodnight." The system may then return to the "ready" state and wait for a command word from the user. If the user says "talk to me" again, the system may synthesize another one of the plurality of responses, such as "just say Wake Up and I'll be back," and then return to the "ready" state. However, if the response is another command word, the system may execute an algorithm corresponding to the command word received (e.g., the lightswitch algorithm, sleep guard algorithm, or good night algorithm).

Figure 19:
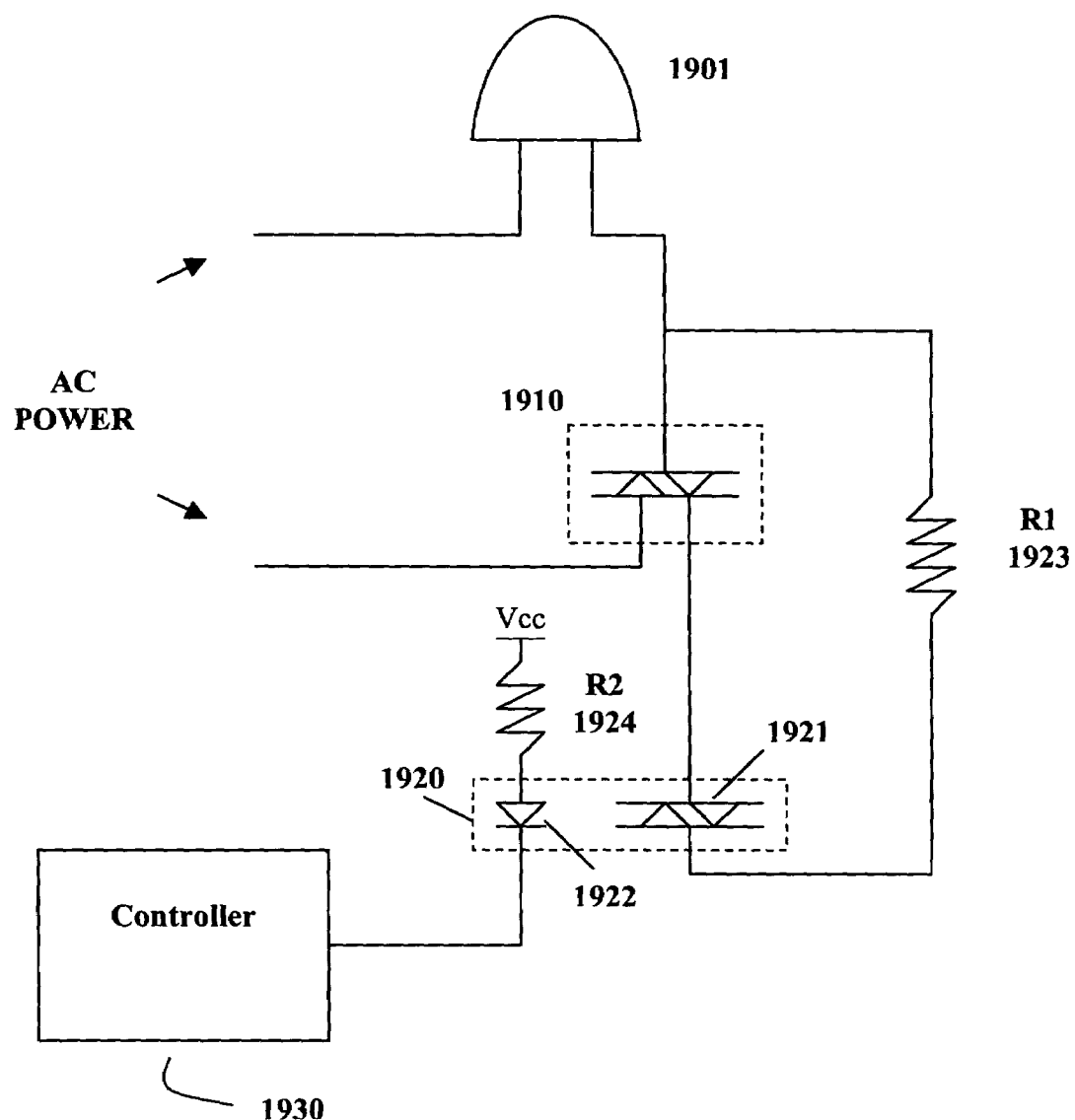
FIG. 19 is an example of a light element control switch according to one embodiment of the present invention.

FIG. 19 is an example of a light element power control switch according to one embodiment of the present invention. In this example, a light element 1901 is coupled in series with a Triac 1910 across AC power. One terminal of Triac 1910 is coupled to a series connected resistor 1923 and one terminal of a Diac 1921. The other terminal of the resistor is coupled to the second terminal of Triac 1910 and a terminal of the light element 1901. Diac 1921 is provided in the same package 1920 as light emitting diode 1922. The one terminal of diode 1922 is coupled to a power supply (Vcc) through resistor 1924, and the other terminal of diode 1922 is coupled to a digital control line of controller 1930. Thus, the controller may turn off power to the light element by activating diode 1922, which is optically coupled to Diac 1921. The light element may be dimmed by turning on the light element for portions each AC power cycle. Of course, other techniques and circuits could be used for controlling the light element, and the present circuit is provided only as an example.

In one embodiment, the system may initially set the light element into the "off" state when there is light in the room, but then automatically set the light element into the "dimmed" state when it becomes dark (an advantageous feature for applications directed toward children). For example, the output of a light sensor may be continuously monitored by a controller, and when the light sensor output drops below a certain level, the controller may send signals to an automatic control switch to reduce power to the light element.

Examples have been given for lamps, but the concepts can be applied much more widely to a variety of applications including toys, cell-phones, consumer electronics, home automation, medical, industrial, automotive applications and other industries. Auxiliary sensing devices discussed include motion, light, current, and sound detectors, but could include a variety of other types of sensors including amplitude, frequency, acceleration, speed, vision, smell, motion, direction, touch, taste, temperature, humidity/wetness, position, energy, and more.

Having fully described at least one embodiment of the present invention, other equivalent or alternative methods of implementing the audio recognition peripheral according to the present invention will be apparent to those skilled in the art. The invention has been described above by way of illustration, and the specific embodiments disclosed are not intended to limit the invention to the particular forms disclosed. The invention is thus to cover all modifications, equivalents, and alternatives falling within the spirit and scope of the following claims.

What is claimed is:

1. A speech recognition system comprising:
    a light element;
    a power control switch coupled between the light element and an AC power supply, the power control switch varying the power delivered to the light element;
    a controller coupled to the power control switch, wherein the controller dims the light element when the light sensor output is below a threshold;
    a light sensor having an output coupled to the controller;
    a microphone;
    a speech recognizer coupled to the microphone for recognizing speech input signals and transmitting recognition results to the controller; and
    a speech synthesizer coupled to the controller for generating synthesized speech,
    wherein the controller varies the power to the light element in accordance with the recognition results received from the speech recognizer and the output of the light sensor.

2. The speech recognition system of claim 1 further comprising a display.

3. The speech recognition system of claim 2 wherein the display comprises a plurality of light emitting diodes.

4. The speech recognition system of claim 1 wherein the controller is a microcontroller.

5. The speech recognition system of claim 1 wherein the speech recognition system is a lamp, the lamp further comprising a lamp attachment movably attached to the lamp by a magnet.

6. A speech recognition system comprising:
    a light element;
    a power control switch coupled between the light element and an AC power supply, the power control switch varying the power delivered to the light element;
    a controller coupled to the power control switch;
    a light sensor having an output coupled to the controller, wherein the light element is switched from an on state to a dimmed state in response to voice commands when the light sensor output is below a threshold;
    a microphone;
    a speech recognizer coupled to the microphone for recognizing speech input signals and transmitting recognition results to the controller; and
    a speech synthesizer coupled to the controller for generating synthesized speech,
    wherein the controller varies the power to the light element in accordance with the recognition results received from the speech recognizer and the output of the light sensor.

7. The speech recognition system of claim 6 further comprising a display.

8. The speech recognition system of claim 7 wherein the display comprises a plurality of light emitting diodes.

9. The speech recognition system of claim 6 wherein the controller is a microcontroller.

10. The speech recognition system of claim 6 wherein the speech recognition system is a lamp, the lamp further comprising a lamp attachment movably attached to the lamp by a magnet.

11. A speech recognition system comprising:
a light element;
a power control switch coupled between the light element and an AC power supply, the power control switch varying the power delivered to the light element;
a controller coupled to the power control switch;
a first auxiliary sensing device having an output coupled to the controller;
a microphone;
a speech recognizer coupled to the microphone for recognizing speech input signals and transmitting recognition results to the controller; and
a speech synthesizer coupled to the controller for generating synthesized speech,
wherein the controller varies the power to the light element in accordance with the recognition results received from the speech recognizer and the output of the auxiliary sensing device, and wherein the controller is programmed with an algorithm comprising:
generating a first dialog;
generating a second dialog in response to receiving a trigger word from a user if the trigger word is in a first recognition set;
executing one of a plurality of predefined algorithms in response to receiving a command word from a user if the command word is in a second recognition set, the plurality of predefined algorithms including varying the power to a light element, generating a simulated dialog with a user or activating a plurality of light emitting diodes.

12. The speech recognition system of claim 11 further comprising a display.

13. The speech recognition system of claim 12 wherein the display comprises a plurality of light emitting diodes.

14. The speech recognition system of claim 11 wherein the controller is a microcontroller or microprocessor.

15. The speech recognition system of claim 11 wherein the speech recognition system is a lamp, the lamp further comprising a lamp attachment movably attached to the lamp by a magnet.

16. A method of controlling a device by voice commands comprising:
storing a plurality of speech synthesis dialogs;
generating a first dialog of the plurality of speech synthesis dialogs using a speech synthesizer;
receiving a trigger word from a user;
generating a second dialog of the plurality of speech synthesis dialogs using a speech synthesizer if the trigger word is in a first recognition set;
receiving a command word from a user; and
executing one of a plurality of predefined algorithms if the command word is in a second recognition set, the plurality of predefined algorithms including varying the power to a light element.

17. The method of claim 16 further comprising automatically dimming a light element.

18. The method of claim 16 wherein the plurality of predefined algorithms further includes generating a simulated dialog with a user.

19. The method of claim 16 wherein the plurality of predefined algorithms includes activating a plurality of light emitting diodes.

20. The method of claim 16 wherein varying power to a light element comprises toggling the light element between an on state and a dim state or off state.

21. The method of claim 16 wherein if the trigger word is in the first recognition set the system enters a ready state for receiving a command word, and wherein the simulated dialog comprises:
generating a third dialog from a second plurality of speech synthesis dialogs; and
returning to the ready state for receiving a command word.

* * * * *